United States Patent
Li et al.

(10) Patent No.: US 7,216,924 B2
(45) Date of Patent: May 15, 2007

(54) BODY TO FRAME ENERGY TRANSFER BRACKETS

(75) Inventors: Haoming Li, West Bloomfield, MI (US); Bryan J. Gilpin, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 387 days.

(21) Appl. No.: 10/970,787

(22) Filed: Oct. 21, 2004

(65) Prior Publication Data

US 2006/0087107 A1  Apr. 27, 2006

(51) Int. Cl.
*B62D 25/20* (2006.01)
*B62D 25/22* (2006.01)

(52) U.S. Cl. ............... 296/187.12; 296/193.05; 296/203.03; 296/204; 296/209

(58) Field of Classification Search ........... 296/187.03, 296/187.12, 193.05, 203.03, 204, 209
See application file for complete search history.

(56) References Cited

U.S. PATENT DOCUMENTS

| | | | | |
|---|---|---|---|---|
| 5,464,266 A | * | 11/1995 | Guertler | 296/187.12 |
| 5,700,049 A | * | 12/1997 | Shibata | 296/203.03 |
| 6,676,200 B1 | | 1/2004 | Peng | 296/204 |
| 6,758,516 B1 | * | 7/2004 | Abramczyk et al. | 296/187.12 |
| 6,786,534 B1 | * | 9/2004 | Peng | 296/187.08 |
| 6,834,912 B2 | * | 12/2004 | Cardimen et al. | 296/204 |
| 6,857,692 B2 | * | 2/2005 | Cardimen et al. | 296/204 |
| 6,932,405 B2 | * | 8/2005 | Nakagawa et al. | 296/29 |
| 7,147,272 B2 | * | 12/2006 | Odaka et al. | 296/187.12 |

* cited by examiner

*Primary Examiner*—D. Glenn Dayoan
*Assistant Examiner*—Greg Blankenship
(74) *Attorney, Agent, or Firm*—Laura C. Hargitt

(57) ABSTRACT

An automotive vehicle comprises a frame having a pair of side rails interconnected by a plurality of cross members. A rocker panel substantially parallel to and spaced from each side rail creates a gap. An energy transfer member seats within the gap for transferring energy between the rocker panel and the side rail in a side impact event. The energy transfer member is sufficiently stronger than the side rail such that impact energy deforms the rocker panel and travels through the energy transfer member to deform the side rail prior to any deformation of the energy transfer member, thereby maintaining the gap to reduce side structure intrusion into an occupant compartment. An accelerometer mounted within the vehicle inboard of the side rails senses vehicle frame acceleration, and activates a vehicle airbag system as necessary.

11 Claims, 3 Drawing Sheets

US 7,216,924 B2

BODY TO FRAME ENERGY TRANSFER BRACKETS

TECHNICAL FIELD

The present invention relates to automotive vehicle body structures, and particularly to brackets for improving side impact energy absorption.

BACKGROUND OF THE INVENTION

In body-on-frame vehicle architecture, a vehicle body mounts atop a vehicle frame in a two-piece construction. Typically, the vehicle frame comprises a pair of side frame rails interconnected by a plurality of cross members. Vehicle drive line, suspension, and body subsystems mount to the frame. The vehicle body includes a rocker panel extending between front and rear fenders below a door panel. In a closed position, a vehicle door overlies a portion of the rocker panel. In conventional body-on-frame vehicles, a gap exists between the rocker panel and the frame rail following assembly. In a side impact collision, plastic deformation of sheet metal disposed within the gap closes the gap prior to energy transfer to the frame rail.

Modern vehicles usually employ a vehicle sensing and diagnostic module (SDM) for detecting a vehicle impact and effecting air bag deployment when acceleration from the impact exceeds a predetermined threshold. The SDM typically includes an accelerometer mounted to the vehicle body inboard of the frame rails for sensing the acceleration.

SUMMARY OF THE INVENTION

The present invention provides a body-on-frame type automotive vehicle comprising a vehicle frame having a pair of side rails interconnected by a plurality of cross members. The vehicle further comprises a rocker panel substantially parallel to and spaced from each side rail, thereby creating a gap. An energy transfer member seats within the gap to transfer energy between the rocker panel and the side rail. The energy transfer member, being sufficiently stronger than the side rail, receives energy from the rocker panel during a side impact, and transmits the energy to the side rail before experiencing plastic deformation. In the preferred embodiment, the energy transfer member comprises a bracket fixed to and extending outward from the side rail into the gap. The bracket design allows energy absorption from both direct and offset loading.

An accelerometer mounted on the vehicle body inboard of the side rails senses vehicle frame acceleration, and activates a vehicle airbag system when acceleration exceeds a predetermined threshold. The accelerometer mounts to the vehicle body, typically above a floorpan and beneath a center storage area. The accelerometer may be disposed elsewhere without changing the inventive concept. Energy received by the side rail accelerates the vehicle frame to actuate the accelerometer. Since the bracket transfers energy to the side rails prior to plastic deformation, the accelerometer is also actuated prior to plastic deformation of the bracket.

The invention is preferably practiced using a plurality of brackets disposed along each of the side rails for maximum energy transfer. By transmitting side impact energy more quickly to the side rails without closing the gap, the brackets reduce side structure intrusion into the vehicle interior, while also providing more rapid actuation of a vehicle airbag system.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
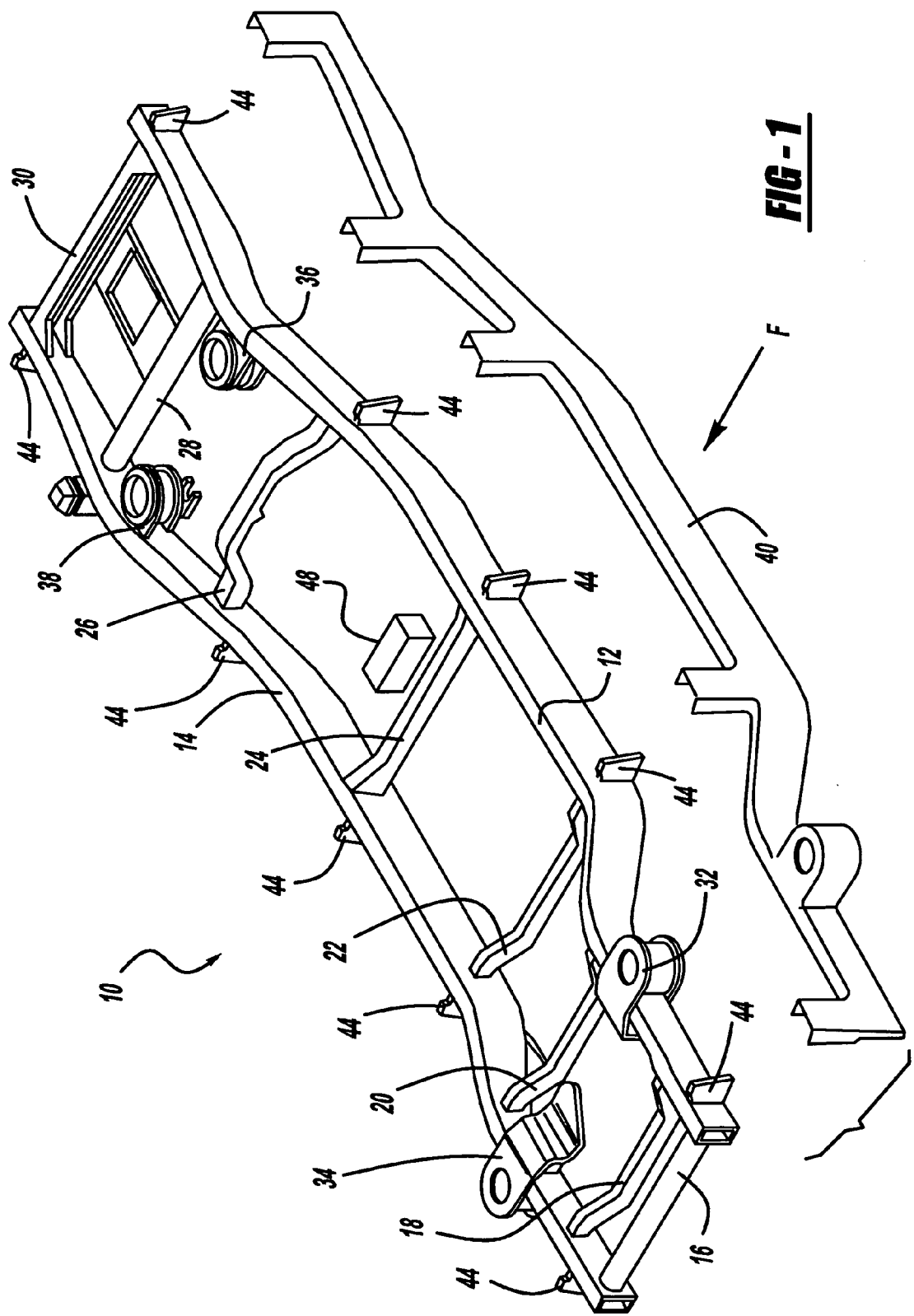
FIG. 1 is a perspective view of a typical vehicle frame of a body-on-frame type vehicle.
Figure 2:
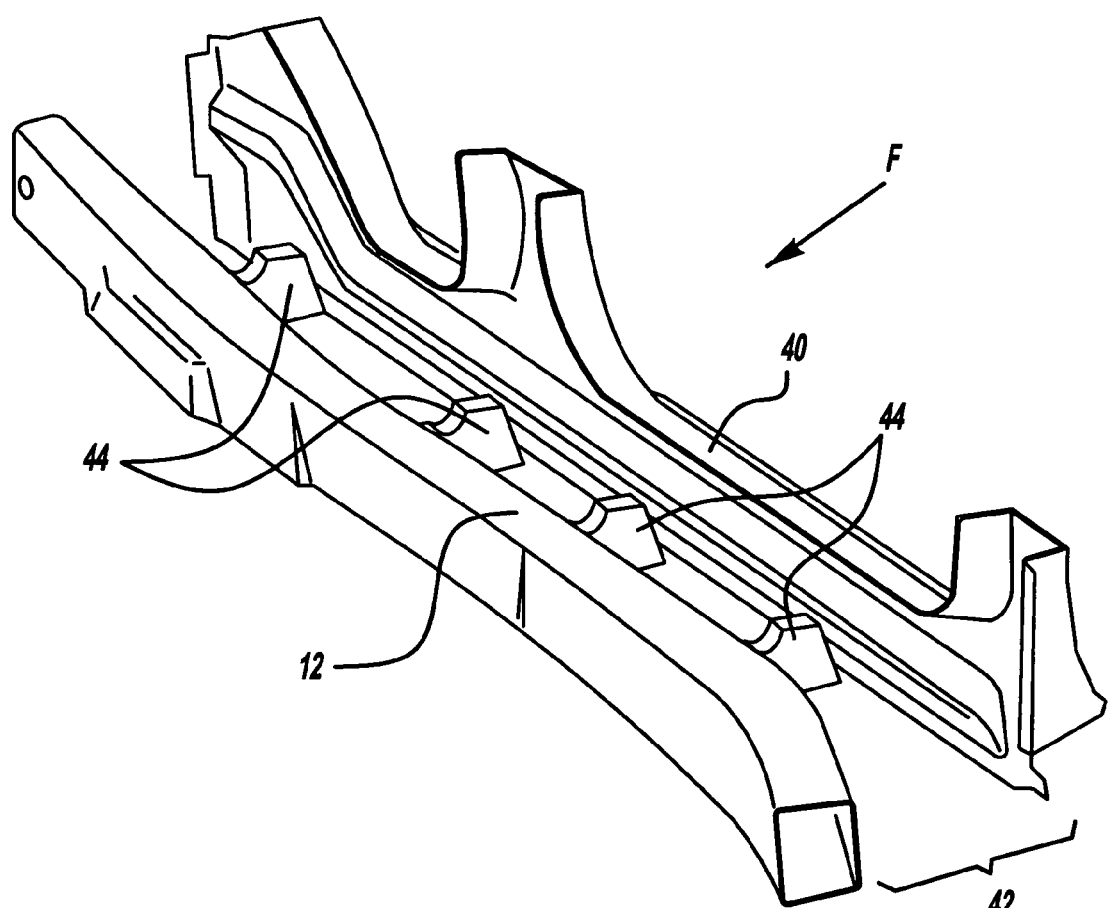
FIG. 2 is an enlarged perspective view of a portion of the vehicle frame of FIG. 1 showing a plurality of energy transfer brackets disposed between a frame rail and a rocker panel according to the present invention.

Referring to FIG. 1, a vehicle frame 10 comprises a pair of side frame rails 12, 14 interconnected by a plurality of cross members 16, 18, 20, 22, 24, 26, 28, 30. The cross members 16, 18, 20, 22, 24, 26, 28, 30 increase strength and rigidity within the frame 10. This particular frame configuration is usually referred to as a "ladder frame." Conventional suspension mounting structures 32, 34, 36, 38 secure to the frame rails 12, 14 as known in the art. Referring to FIGS. 1 and 2, a rocker panel 40 covers frame rail 12, creating a gap 42 therebetween. A substantially identical rocker panel also covers frame rail 14, although only one rocker panel 40 is shown in the figures. Since the frame rails 12, 14 are substantially mirror images, it should be appreciated that a description of one side of the vehicle, i.e. frame rail 12 and rocker panel 40, will suffice as a description for both sides of the vehicle.

Preferably, a plurality of energy transfer brackets 44 are fixed to the frame rails 12, 14 to transfer energy to the frame rails 12, 14 during a side impact collision. The brackets 44 are manufactured to be stronger than the frame rails 12, 14. For instance, if the frame rails 12, 14 comprise 40 kilopounds per square inch (ksi) steel, the energy transfer brackets 44 comprise steel stronger than 40 ksi. Alternatively, the brackets 44 may be thicker than the frame rails 12, 14, thereby imparting more strength thereto. For example, steel used to manufacture a typical frame rail 12, 14 is approximately 2.5–3.5 millimeters thick. A material less rigid than that used for the frame rails 12, 14 may be used for the brackets 44 as long as bracket thickness sufficiently exceeds 2.5–3.5 millimeters to provide stronger brackets 44 than frame rails 12, 14.

Figure 3A:
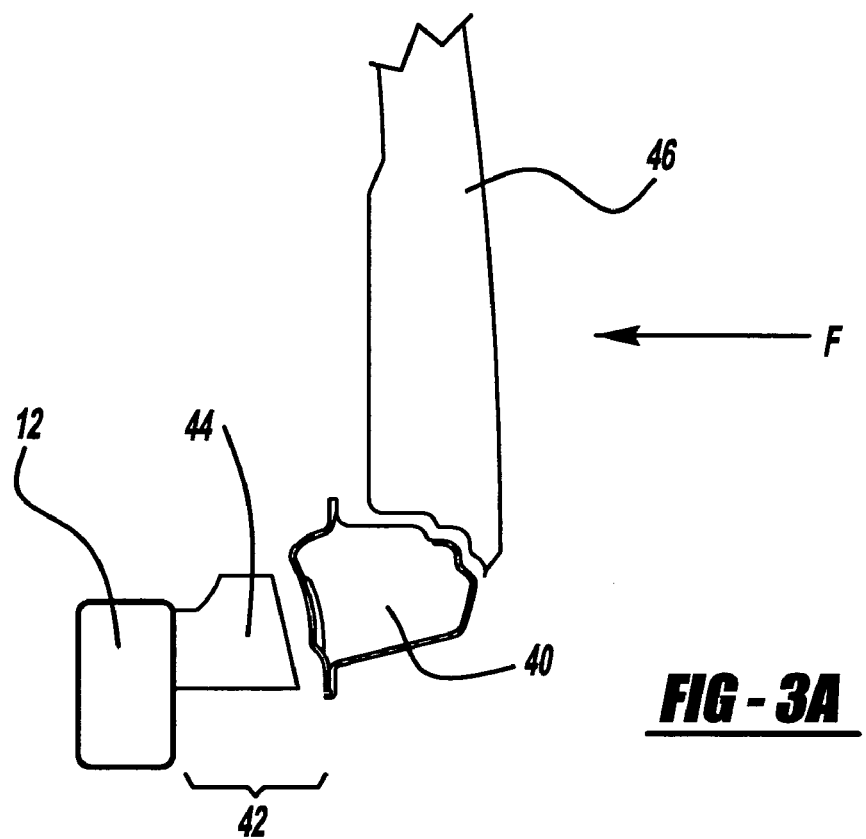
FIG. 3A is a cross-sectional view of the frame rail, bracket and rocker panel of FIG. 2 prior to a side impact.
Figure 3B:
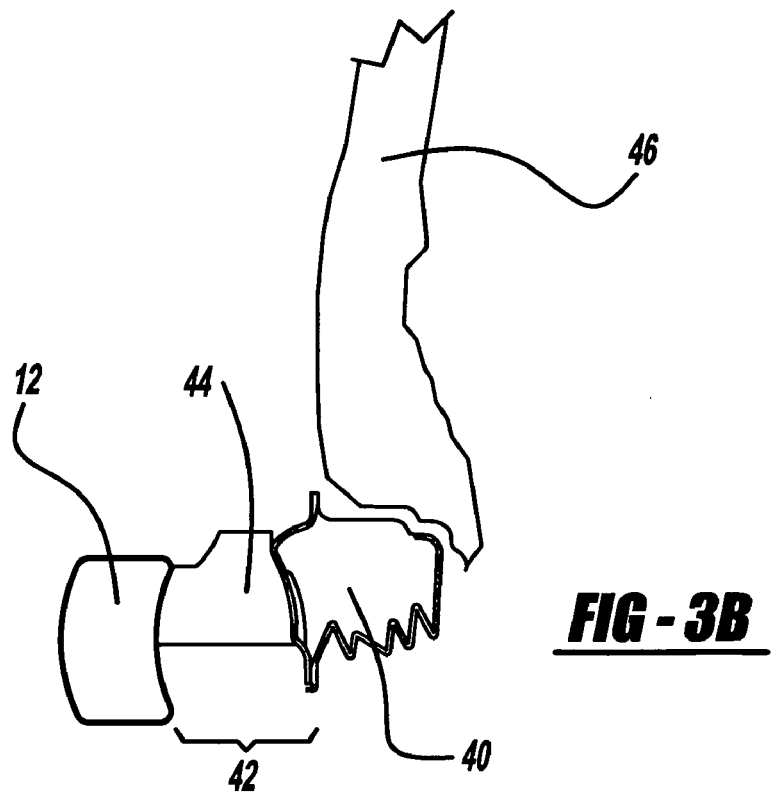
FIG. 3B is a cross-sectional view of the frame rail, bracket and rocker panel of FIG. 2 following a side impact.

FIG. 3A shows a cross-sectional view of the rocker panel 40, the bracket 44, and the frame rail 12 prior to a side impact event. Bracket 44 is outboard of rail 12, at least partially located in the gap 42 between the rail 12 and the rocker panel 40. A vehicle door 46 covers a portion of the rocker panel 40. Typically, in a prior art vehicle, application of a force F will first deform the door 46 and the rocker panel 40, then any sheet metal disposed within the gap 42 between the rocker panel 40 and the frame rail 12, and finally the frame rail 12 itself. Referring to FIG. 3B, which shows a cross-sectional view of the door 46, the rocker panel 40, the bracket 44, and the frame rail 12 following application of the force F, the force F first deforms the door 46 and the rocker panel 40. However, since the brackets 44 disposed between the rocker panel 40 and the frame rail 12 are stronger than the frame rail 12, the brackets 44 do not deform next. Instead, the brackets 44 transmit the force F directly to the frame rail 12, causing frame rail 12 deformation prior to bracket 44 deformation. In other words, the bracket 44 is sufficiently strong such that the bracket 44 will plastically deform as a result of side impact load F, if at all, only after plastic deformation of side rail 12. Since the brackets 44 do not deform, the gap 42 does not close, thereby reducing intrusion by the rocker panel 40 and other portions of a vehicle side structure into the interior occupant compartment of the vehicle. Minimal deformation of the brackets 44 may occur after the force F is transferred to the frame rail 12. While bracket deformation will cause minimal reduction in the size of the gap 42, interior compartment intrusion will still be reduced.

Referring again to FIG. 1, in a side impact event, the rocker panel 40 readily deforms, imparting minimal acceleration to the vehicle frame 10. Since the frame rail 12 is much more rigid than the rocker panel 40, side impact energy deforms the frame rail 12 slightly, and accelerates the vehicle frame 10. An accelerometer 48 disposed inboard of the frame rails 12, 14 senses this lateral acceleration to activate a vehicle airbag system when the acceleration exceeds a predetermined threshold as known in the art. Since the brackets 44 transmit the side impact load force F directly to the frame rail 12 prior to experiencing plastic deformation, the accelerometer 48 is also actuated prior to plastic deformation of the brackets 44. The present invention thus allows sooner deployment of a vehicle airbag following a side impact. The accelerometer 48 may be disposed anywhere within the vehicle as long as it is configured to sense lateral acceleration of the vehicle frame 10, but typically mounts to a vehicle body above a floorpan and beneath a center storage area.

Since the frame rails 12, 14 can support thicker brackets 44, the brackets 44 may be designed to transfer offset loading during a side impact event, a major advantage over prior art energy transfer systems. The brackets 44 can further be used to mount side assist steps or running boards to the frame rails 12, 14, eliminating the need for additional vehicle hardware.

It can thus be seen that a bracket according to the present invention transfers energy to a frame rail prior to deformation to reduce side structure intrusion into an interior compartment without requiring major modifications of a vehicle structure. Additionally, the bracket more quickly activates a vehicle sensing and diagnostic module allowing for quicker airbag deployment following a side impact event.

While the best mode for carrying out the invention has been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. A body-on-frame automotive vehicle comprising:
a vehicle frame having at least one side rail for absorbing energy during a side impact event;
a rocker panel substantially parallel to and spaced from said side rail, thereby creating a gap; and
at least one energy transfer member disposed within said gap such that energy from a side impact travels through said rocker panel to said at least one energy transfer member and through said at least one energy transfer member to said side rail, said at least one energy transfer member being sufficiently stronger than said side rail such that said at least one energy transfer member deforms, if at all, only after plastic deformation of said side rail.

2. The automotive vehicle of claim 1 wherein said at least one energy transfer member comprises at least one bracket attached to and extending outward from said side rail into said gap.

3. The automotive vehicle of claim 2 wherein said at least one bracket includes a plurality of brackets being spaced apart from one another and attached to, and extending outward from, said side rail into said gap.

4. The automotive vehicle of claim 1 wherein said at least one energy transfer member is configured to receive and transfer energy from both direct and offset loading conditions.

5. The automotive vehicle of claim 1 further comprising an accelerometer disposed inboard of said side rail for sensing vehicle frame acceleration and activating a vehicle airbag system when frame acceleration exceeds a predetermined threshold.

6. The automotive vehicle of claim 5 wherein said accelerometer senses impact energy prior to plastic deformation of said energy transfer member.

7. A body-on-frame automotive vehicle comprising:
a vehicle frame having at least one side rail; and
an energy transfer member attached to and extending outboard from said side rail, said energy transfer member being sufficiently stronger than said side rail such that energy from a side impact plastically deforms said side rail prior to plastically deforming said energy transfer member.

8. The automotive vehicle of claim 7, further comprising an accelerometer disposed inboard of said at least one side rail for sensing vehicle frame acceleration and activating a vehicle airbag system when frame acceleration exceeds a predetermined threshold.

9. The automotive vehicle of claim 8, wherein said vehicle is configured such that said accelerometer senses frame acceleration prior to plastic deformation of said energy transfer member.

10. A body-on-frame automotive vehicle comprising:
a vehicle frame comprising a side rail with a plurality of cross members extending therefrom;
a rocker panel substantially parallel to and spaced from said side rail to create a gap;
at least one bracket extending from said side rail into said gap and configured to transmit a load from a side impact event to said side rail, said at least one bracket being sufficiently stronger than said side rail such that said at least one bracket plastically deforms, if at all, as a result of said load only after said side rail plastically deforms; and
an accelerometer disposed inboard of said side rail for sensing frame acceleration resulting from said load and activating a vehicle airbag system when frame acceleration exceeds a predetermined threshold, said at least one bracket being sufficiently configured to plastically deform, if at all, as a result of said load only after the frame acceleration exceeds the predetermined threshold.

11. The automotive vehicle of claim 10 wherein said at least one bracket further comprises a plurality of brackets extending from said side rail into said gap.

* * * * *